Patented July 22, 1941

2,250,270

UNITED STATES PATENT OFFICE 2,250,270

COEROXANE COMPOUNDS

Eugene A. Markush, Jersey City, N. J., John J. Malawista, Brooklyn, N. Y., and Julius Miller, Newark, N. J., assignors to Pharma Chemical Corporation, New York, N. Y., a corporation of New York No Drawing. Application March 31, 1938, Serial No. 199,188

1 Claim. (Cl. 260—335)

Our invention relates to the production of new coeroxane compounds and refers particularly to the esters and ethers of coeroxane.

Coeroxene and its heretofore known derivatives are described in Liebig's Annalen der Chemie, volume 348, pages 210–239, volume 356, pages 317–325, and in English Patents 447,469 and 448,180.

We have discovered, contrary to expectation, that ethers and esters of 4:14 dimethyl coeroxonol-9 (as for example Annalen 356, 324, the methyl or ethyl ether) are readily reducible to the corresponding coeroxane compounds which are yellow bodies of excellent solubility in organic solvents, oils, and waxes, and which impart to these solvents strong, brilliant fluorescence.

Both the aforementioned patents and literature deal only with the reduction of the dimethyl coeroxon to the dimethyl coeroxene and dimethyl coeroxenol acetate.

The general procedure of the reaction in our invention is

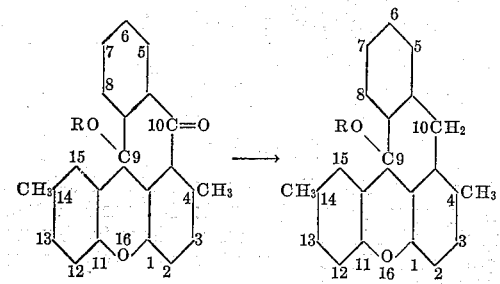

the latter being the probable general formula of our newly discovered compounds and in which "R" may be alkyl, aralkyl, aryl (or substitution products thereof), or the residue of an acid group of the fatty series, or aromatic series, or heterocyclic type.

The following examples illustrate in part the preparation of some of the newly invented compounds:

EXAMPLE 1

Alkylation

A mixture of 50 grams 4:14 dimethyl-coeroxonol-9, 450 cc. water, 100 grams sodium-hydroxide (50% solution) are heated to 80° C., and 37 grams diethyl-sulfate are added at once. The temperature rises to about 86° C. This temperature is maintained for one hour; the mixture is cooled, diluted with water, the precipitate filtered, washed, and dried. Yield, 44 grams of ethyl ether of 4:14 dimethyl-coeroxonol-9. M. P. 144–150° C.

Reduction

A mixture of 44 grams 4:14 dimethyl-ethoxy-coeroxonol-9, 250 grams water, 50 grams zinc dust, 125 grams water, and 100 grams sodium hydroxide are heated for 5 hours at 90–100° C. The reaction mixture is cooled, diluted, filtered, the precipitate washed with hot water containing a little caustic soda until the washings are colorless and then washed with water until free of caustic soda.

The precipitate containing zinc is added in small portions to concentrated hydrochloric acid and stirred until all the zinc is dissolved, diluted with water, the precipitate filtered, washed, and dried. Yield, 37.5 grams.

The probable reaction is:

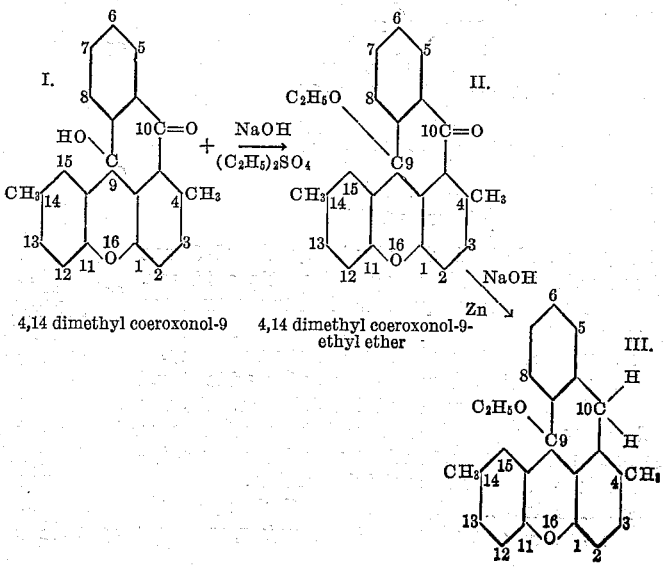

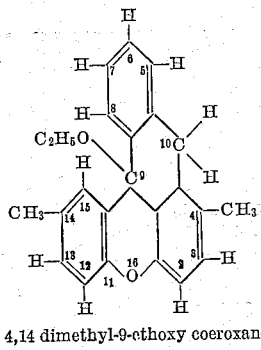

4,14 dimethyl-9-ethoxy coeroxane

The compound is soluble in oils with a greenish yellow fluorescence.

Example II

*Alkylation*

A mixture of 50 grams 4:14 dimethyl-coeroxonol-9, 450 cc. water, 100 grams sodium hydroxide 50% solution are heated to 90° C., cooled to 50° C., and 30 grams dimethyl-sulfate are added at once. The temperature rises to 56° C. The mixture is held at this temperature for one hour, cooled, diluted with water, the precipitate filtered, washed, and dried. Yield, 40 grams of 4:14 dimethyl coeroxonol 9-methylether. M. P. 105°.

*Reduction*

A mixture of 40 grams 4:14 dimethyl-coeroxonol-9-methyl ether, 250 grams water, 50 grams zinc dust, 125 grams water, and 100 grams sodium-hydroxide are heated for 5 hours at 90–100° C. The reaction mixture is cooled, diluted, filtered, the precipitate washed with hot water containing a little caustic soda, until the washings are colorless, and then washed with water until free of caustic soda.

The precipitate containing zinc is added in small portions to concentrated hydrochloric acid and stirred until all the zinc is dissolved, diluted with water, the precipitate filtered, washed, and dried. Yield, 30.5 grams.

This methyl compound is somewhat better soluble in oils with greenish yellow fluorescence.

The probable formula is:

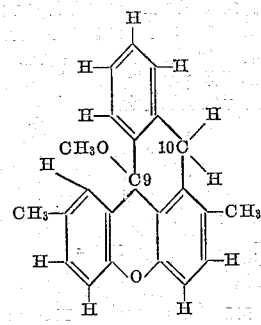

Example III 50 parts of 4:14 dimethyl-coeroxonol-9 are stirred into 450 parts of glacial acetic acid and 100 parts of acetic anhydride. The reaction mass is heated to the boiling point and refluxed for 3 hours and allowed to stand until the next day.

25 parts of zinc dust are carefully added and the mixture again refluxed for 3 hours. At the end of the period the color of the reaction mass assumes a pronounced yellow tone from the original violet brown of the initial reaction.

The mass is allowed to cool and discharged into a large volume of water. After filtering, washing the press cake until free of acid, and drying there is obtained 40 parts of an olive-yellow powder which is clearly soluble in alcohols and ethers. It imparts a bright yellow fluorescence to the solvent used.

Its probable formula is:

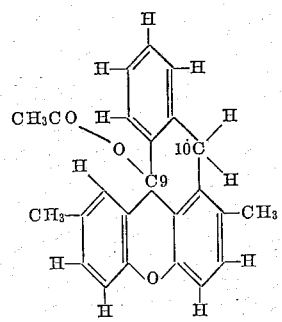

Example IV 50 parts of propylether of 4:14 dimethyl coeroxonol-9 prepared by refluxing the 4:14 dimethyl-coeroxonol-9 with excess propyl alcohol are reduced and isolated according to the procedure described in Example I.

The yellow orange powder, yield 50 parts, dissolves in organic solvents with a bright yellow coloration and imparts a powerful yellow fluorescence and pearliness to the solvent employed.

The probable formula is:

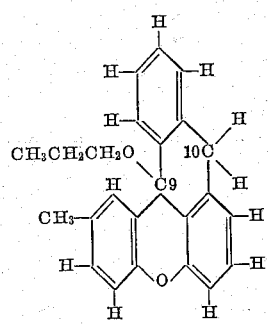

Example V

By substituting the corresponding iso-butyl-ether prepared by boiling 4:14 dimethyl-coeroxonol-9 with iso-butyl alcohol, there is obtained in good yield the compound whose probable formula is:

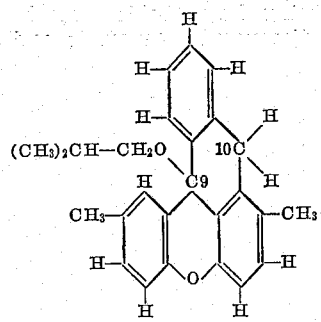

This orange colored body dissolves in organic solvents and imparts a powerful fluorescence somewhat bluer than either the propyl or the ethyl compounds.

Example VI

To a solution of 50 parts sodium hydroxide in 500 parts water are added 50 parts 4:14 dimethyl-coeroxonol-9 and the reaction mixture heated to 80° C. At this temperature, with good stirring, 40½ parts of benzoyl chloride are added slowly.

The temperature rises to 90° C., where it is maintained for 2 hours. Minimum alkalinity of pH 8 should be maintained.

The mixture is allowed to cool, diluted with two volumes of water, and filtered. The cake is washed with a 5% sodium hydroxide solution and then with cold water until free of alkali and then dried. The yield is 50 parts of the benzoyl ester. The ester is then reduced by prolonged boiling in glacial acetic acid (10 parts for 1 part ester) and zinc dust (½ part for 1 part ester). After cooling and diluting with water the reduced body is removed by filtering, then washed well, and dried. Oil-insoluble bodies, such as zinc, are removed by dissolving the product in benzol or toluol or other low boiling organic solvents, filtering from insolubles, and distilling the solvent.

From 50 parts of benzoyl ester of 4:14 dimethyl-coeroxonol-9 there are obtained 43 to 47 parts of a bright orange powder which, when dissolved in mineral oil, imparts a bright yellow fluorescence. The probable formula of the body is:

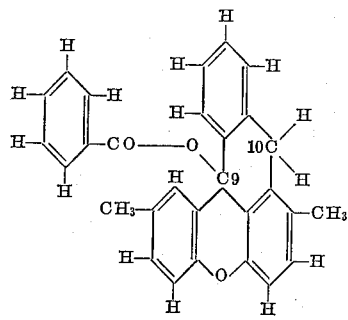

By substituting for benzoyl chloride equivalent components of m-nitro-benzoyl chloride, p-nitro-benzoyl chloride, furoyl chloride, thio-phenyl chloride, and nicotinyl chloride and following the described procedure, the corresponding esters are obtained.

EXAMPLE VII 50 parts of 4:14 dimethyl-coeroxonol-9 are added to a solution of 50 parts sodium hydroxide in 500 parts of water. 40 parts of benzyl chloride are added and the reaction mass stirred at 30-35° C., for several days. After filtering, washing with diluted sodium hydroxide solution (5%), and then with water, the benzyl ether of 4:14 dimethyl coeroxonol-9 is obtained. When reduced according to the method described in Example 1, a brownish powder is obtained which imparts a greenish-yellow fluorescence to organic solvents.

Its probable formula is:

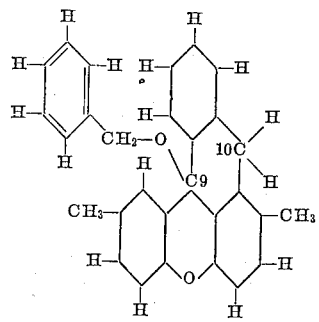

We do not limit ourselves to the particular chemicals, quantities, times, temperatures, or other steps of procedure specifically mentioned as these are given simply for the purpose of clearly describing our invention.

What we claim is:

Compounds having the general formula

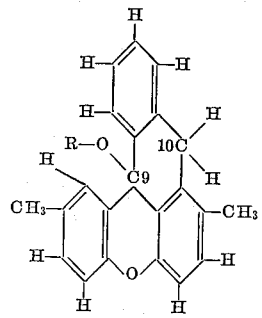

in which R is the radical of a member of the group consisting of aliphatic hydrocarbon, aralkyl hydrocarbon and heterocyclic compounds.

EUGENE A. MARKUSH.
JOHN J. MALAWISTA.
JULIUS MILLER.